United States Patent [19]

Springborn

[11] 4,340,350
[45] Jul. 20, 1982

[54] PROCESS AND APPARATUS FOR THE MANUFACTURE OF SINTERED TUNGSTEN CARBIDE TOOL TIPS

[75] Inventor: Karl S. Springborn, Waverley, Australia

[73] Assignee: Austung Proprietary Limited, South Yarra, Australia

[21] Appl. No.: 180,942

[22] Filed: Aug. 25, 1980

Related U.S. Application Data

[62] Division of Ser. No. 84,296, Oct. 12, 1979, Pat. No. 4,303,416.

[30] Foreign Application Priority Data

Oct. 20, 1978 [AU] Australia ............................ PD6483

[51] Int. Cl.³ ............................ B29C 1/00; B29C 3/00
[52] U.S. Cl. .................................... 425/409; 100/218; 425/77; 425/441; 425/450.1

[58] Field of Search ............... 425/233, 236, 408, 412, 425/416, 422, 577, 579, 580, 586, 77, 78, 411, 335, 352, 363, 406, 409, 436, 441, 450.1; 51/293; 100/218 X, 234, 236, 243, 221, 264 X, 295 X

[56] References Cited

U.S. PATENT DOCUMENTS

| | | | |
|---|---|---|---|
| 1,572,724 | 2/1926 | Johnson et al. | 425/422 |
| 3,461,506 | 8/1969 | Rice et al. | 425/422 |
| 3,491,826 | 1/1970 | Potts | 425/422 |
| 3,932,085 | 1/1976 | Horbach | 425/577 |

Primary Examiner—Willard E. Hoag
Attorney, Agent, or Firm—Depaoli & O'Brien

[57] ABSTRACT

A press for cold-forming granular tungsten carbide cutting tool edge blanks for sintering, it has helical edges on jaws which open and close around a center pin and are of a depth which allows for shrinkage during sintering, top, bottom and side members seal the forming cavity; a grahite sinter fixture has similarly-shaped forming and sealing components to the press but relies only on gravitational surface reaction to close components against a pressed blank to prevent shrinkage distortion during sintering.

13 Claims, 4 Drawing Figures

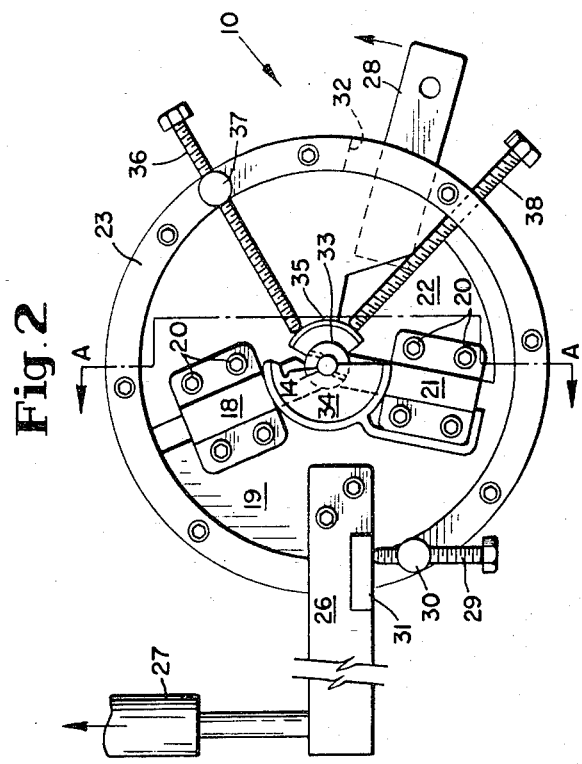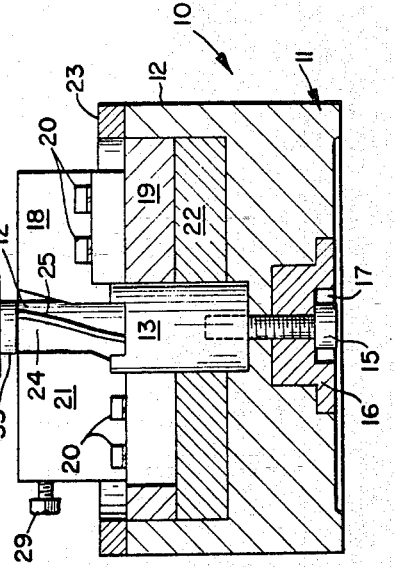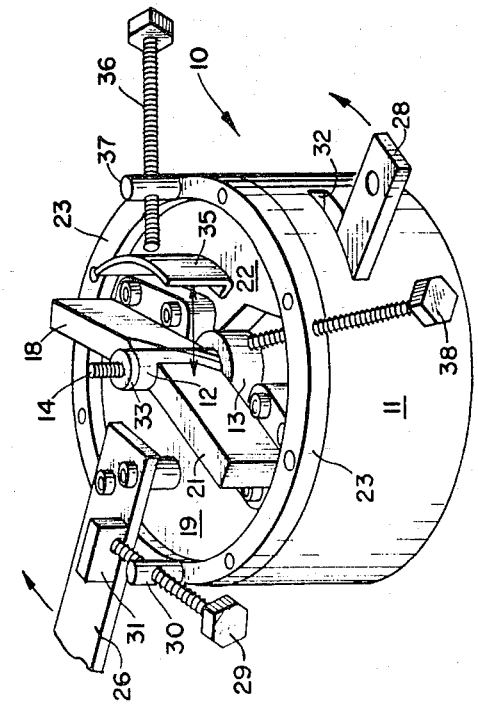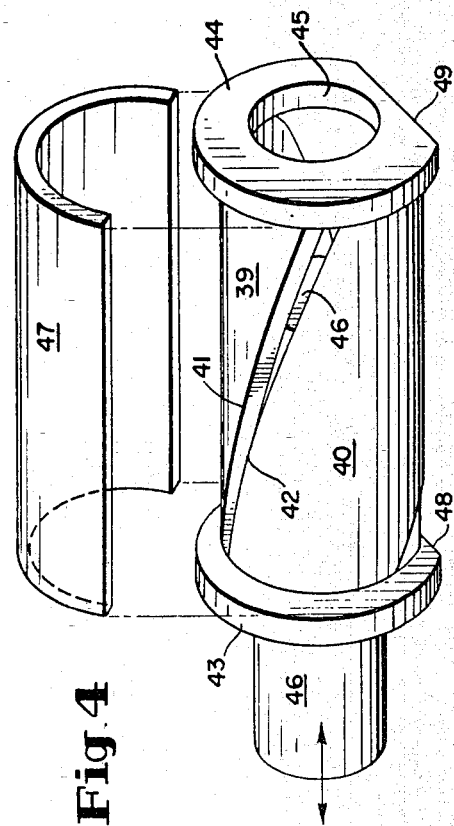

PROCESS AND APPARATUS FOR THE MANUFACTURE OF SINTERED TUNGSTEN CARBIDE TOOL TIPS

This is a division of application Ser. No. 084,296 filed Oct. 12, 1979 now U.S. Pat. No. 4,303,416.

This invention concerns methods and apparatus for pressing, forming and sintering of tungsten carbide blanks for cutting tool bit inserts and is particularly concerned with a method and device for sintering pressed, helical or spiral cutting tool bit insert blanks while compensating for shrinkage distortion of the blank during sintering.

Sintered tungsten carbide cutting tool bit insert blanks used as cutting edges on high speed cutting tools such as augers or in milling machines are made by pressing powdered tungsten carbide, sometimes mixed with cobalt, under pressure into slabs or ingots from which special shapes are then cut or pressed directly into blanks of desired shape or size. Blanks are then semi-sintered in a non-oxidizing atmosphere at temperatures below 1472° F. and are further shaped by machining. Final sintering is then carried out but the sintered carbide so obtained is so hard that the shape can only be changed by diamond cutter grinding. It would be desirable to obtain a sintered shape as near to the finally desired shape as possible however in sintering techniques uncontrolled shrinkage of the tungsten carbide occurs in known art. An attempt to overcome shrinkage distortion by brushing carbide powder onto a spiral or helical cutting tool edge, partially sintering the carbide onto the tool has been made but requires reheating and bending of the tool. Another industrial technique involves placing a strip of pre-sintered or partially sintered carbide alongside the spiral cutting contour of a cutting tool and then fusing the tungsten carbide onto the tool by sintering at a higher temperature than the first-stage temperature. Uncontrolled shrinkage and distortion of the shape of the pressed carbide cutting tool insert blank occurs during sintering in the prior art processes.

One object of this invention is to provide a method for cold press forming of tungsten carbide blanks for sintering and subsequent fitment to cutting tool edges as inserts.

Another object is to provide apparatus for cold press-forming of tungsten carbide blanks for sintering and then fitment to cutting tool edges as inserts.

A further object is to provide a method for controlling the edges and surfaces of a pressed tungsten carbide blank susceptible to shrinkage shape distortion while sintering the blank for fitment to a cutting tool edge as an insert.

A still further object is to provide a device for sintering pressed, helically or spirally shaped cutting tool edge insert blanks of tungsten carbide wherein means are provided for controlling the edges and surfaces of the blank which are susceptible to shrinkage shape distortion during sintering.

The invention, according to one general aspect, resides in a method for the manufacture of pressed, shaped blanks from particulate tungsten carbide material for sintering and then fitment to cutting tool edges as inserts which comprises, charging the particulate carbide into a split die former press in a cavity formed about a centre pin by contra-reciprocating jaw members and top, bottom and side members, confining the charge between the members, closing the members and applying pressure in at least an angular direction to shape the blank and opening the members to eject the blank.

Preferably, the blank is of spiral or helical configuration and is formed from tungsten carbide granules of 80 mesh.

The invention according to another general aspect, resides in apparatus for the manufacture of pressed blanks from particulate tungsten carbide for sintering and then fitment to cutting tool edges as inserts which comprises, a press assembly having a body portion housing a central vertical forming pin, a compression jaw and an ejection jaw forming a split die adapted for horizontal, angular reciprocation about the pin in sequential jaw opening, carbide charging, closing, pressing and blank ejection movements, vertical and horizontal forming members for defining and sealing the blank charge and forming cavity also being adapted to apply pressure to the charge to form the blank.

Preferably, the split die comprises two sleeve segments divided by helical or spiral separation cuts, the thickness of the edges or surfaces defined by the cuts being substantially equal to the whole diameter or radial height of the blank insert when it is installed along a cutting edge profile of a cutting tool bit. Preferably also the die edge thickness includes an additional shrinkage height allowance of approximately 20%.

The invention according to a further general aspect, resides in a sinter fixture for sintering cutting tool insert blanks from particulate tungsten carbide made by the above-described press and which is constructed as a generally reel-shaped shell split into two segments along separation cuts which are of the same configuration as the blank, each segment having a flanged end and a central bore adapted to receive a removeable pin which is adapted to hold the segments together, the flanged ends having flattened rims angularly off-set with respect to each other about the longitudinal axis of the fixture so that when the fixture is placed upon a flat surface in a sinter furnace, the helically cut or other shaped cut edges of the shells are constrained to move towards each other and to bear against the side walls of a pressed blank, the centre pin also bearing against the bottom surfaces of the blank and a curved cover member being adapted to bear against the top surface of the blank when the fixture is assembled and in use during sintering to compensate against angular and radial shrinkage of the blank during sintering.

A sintering fixture according to the invention has all the components preferably constructed of graphite and the separation cuts of the shell segments are helical or spiral.

Some practical arrangements of preferred forms of the invention will now be described with reference to the accompanying drawings in which:

FIG. 1 is a perspective view of a forming press in accordance with one form of the invention with top pressure application member removed and side cavity-sealing plate loosened.

FIG. 2 is a plan view of the press with side cavity-sealing plate closed up.

FIG. 3 is a vertical section taken along line A—A of FIG. 2,

FIG. 4 is a partially exploded view of the shrinkage compensating, sintering piece for pressed and formed cutter bit insert blanks for high-speed cutting tools.

Referring to the drawings, FIGS. 1 to 3 show a cold-forming press for making pre-sinter blanks of tungsten carbide for high speed tool cutter bit inserts or tips and for similar tools which comprises a bowl-shaped body 10 with a recessed base 11, a side wall 12 and a central column 13 mounted within the body with a centre pin 14 the width of which is equal to the root diameter of a cutting tool bit and which projects above the body. The column 13 is bolted to the body by socket screw 15, the head of which clamps a securing collar 16 into the recess in the base of the body. There is mounted about the centre pin and above the column a compression jaw 18 the base of which is fixed on a compression plate 19 by socket screws 20. An ejection jaw 21 is similarly fixed to the ejection plate 22 which lies under and against the compression plate, both plates being designed for limited, angular reciprocating movement about the column and centre pin. The plates are retained within the body by the plate retaining collar 23. The jaws are formed as matching cylindrically curved sleeves split into two segments along a separation cut depending on the shape of the blank which in this particular example is helical forming a helically shaped cavity on one side of the centre pin and an ejection jaw separation (or closure) slot on the other side of the centre pin. The complementary, helically-shaped mating surfaces 24 and 25 of the split shell segments close against or towards each other and compress a particulate charge of tungsten carbide in an angular movement about the centre pin and move away from the pressed blank and each other when the ejection jaw is actuated. The two helical surfaces opposite the pin from the surfaces 24 and 25 close up about the pin when the surfaces 24 and 25 open up and vice versa. The opening and closing movements of the compression jaw 18 and the compression plate 19 are actuated by the reciprocating angular movement of the compression lever 26 which is powered by suitable means such as a pneumatic ram 27 to compress a carbide charge by application of sufficient pressure for example 100 lb. The movement of the ejection jaws 21 and ejection plate 22 is effected by the ejection lever 28 actuated by means such as a pneumatic ram. The extent of angular travel of the compression lever, plate and jaw is limited by the limit stop screw or bolt 29 mounted on the threaded post 30 and the screw is adapted to bear against the stop block 31. The extent of angular travel of the ejection lever, plate and jaw is limited by the confining edges of the angular slot 32. The forming cavity is sealed against loss of particulate carbide charge by means of the separate cavity top sealing collar 33 sealed under pressure by vertically reciprocating means 34, the separate cavity side sealing plate 35 clamped in position by the upper threaded press bolt 36 mounted on the post 37 and lower threaded press bolt 38 mounted through the plate retaining ring 23.

Referring to FIG. 4, there is shown a sintering fixture for sintering press-formed helically shaped, tungsten carbide cutting tool bit inserts which, although a separate component assembly from the press nevertheless comprises members of similar shape and function and which comprises four components constructed of graphite and in the form of a spool-shaped body on a centre pin and split into two sleeve-like segments along helical separation cuts. The segments 39 and 40 have separation cuts 41 and 42 with flanged partially circular ends 43 and 44 and longitudinal or axial bore 45 adapted to receive a removable, cylindrically shaped pin 46. The pair of opposed helical edges or surfaces of the split segment sleeves are of the same configuration as the pressed and sintered blank and when the pin is inserted into the bore, the surface of the pin is adapted to contact the lower surface of the blank which, in conjunction with the edges forms a forming and blank-retaining cavity. The cavity is also sealed by a top cover plate 47 which contacts the top of the blank. The partially cylindrical ends of each shell are each provided with flattened rims which are designed to be placed upon a flat surface is a sinter furnace and which are each off-set with respect to each other in an angular diection about the longitudinal axis of the sinter fixture so as to produce a torque or twisting closure action of the helical segments against the sides of a pressed tool blank to counteract angular shrinkage distortion of the blank in the direction of the pitch circle of an insert on a cutting tool bit edge when the blank is sintered at 1500° to 1600° C. in the fixture depending on the blank material or grade.

I claim:

1. Apparatus for the manufacture of pressed blanks from particulate tungsten carbide for sintering and then fitment to cutting tool edges as inserts, said apparatus comprising a press assembly having a body, a forming pin which is centrally and vertically disposed within said body, a compression jaw and an ejection jaw forming a split-die which defines the sides of a cavity between said jaws and is adapted for limited, horizontal, angular reciprocation about said forming pin in sequential jaw-opening, carbide-filling, jaw-closing, blank pressing and blank ejection movements, and vertical and horizontal forming members for sealing said cavity formed by said jaws and said members against loss of said particulate tungsten carbide during said carbide-filling, jaw closing, and blank pressing movements.

2. Apparatus according to claim 1, wherein said split-die comprises two sleeve segments split along helical or spiral separation cuts, whereby said cavity is helically shaped, the sleeve thickness being substantially equal to the unsintered radial height of the blank, including an amount to compensate for shrinkage to be expected to occur during said sintering.

3. A split-die, cavity mold press for cold-forming particulate tungsten carbide helical or spiral blanks for cutting tool edges and inserts, which comprises a bowl-shaped body, a common centre pin, opposed compression and ejection jaws which form the sides of a die cavity and which are mounted on superimposed sliding plates about said common centre pin for limited horizontal angular reciprocation in a small circular arc about the pin, a lower portion of the pin forming the floor of said die cavity which is sealed by a top plate and a helically surfaced side plate, and said body forming a housing for said jaws.

4. A press for making a pre-sinter blank of tungsten carbide to be formed into a high speed tool cutter bit insert or tip from a particulate tungsten carbide charge which is added to said press, comprising:

A. a bowl-shaped body having a recessed base and a cylindrical side wall;

B. a column, having a top end and a bottom end, which is coaxially disposed within said body and rigidly attached at said bottom end to said recessed base;

C. a cylindrical centre pin, having a diameter equal to the root diameter of a cutting tool bit to fit said insert, which is rigidly and coaxially attached to said top end of said column, said top end having a larger diameter than said root diameter, D. a means for axially compressing said particulate tungsten carbide charge, comprising:

(1) said top end of said column,
(2) a cavity top sealing collar which is adjustably mounted on said centre pin and spaced from said top end, and
(3) a means for axially pressing said cavity top sealing collar toward said top end;

E. a means for circumferentially compressing said particulate carbide charge, comprising:
(1) a pair of split shell segments of a cylindrically curved sleeve having complementary mating surfaces which form a cavity on one side of said centre pin and an ejection slot on the other side of said centre pin, the top end of said charging cavity being closed by said cavity top sealing collar after said particulate carbide charge is added to said cavity, and the bottom end of said cavity being closed by said top end of said column, and
(2) a means for angularly rotating said segments toward said cavity for circumferentially compressing said particulate carbide charge to form said blank and for angularly rotating said segments toward said slot for ejecting said blank; and F. a means for radially compressing said particulate carbide charge within said cavity, comprising:
(1) said cylindrical centre pin,
(2) a cavity side sealing plate having a height equal to the height of said charging cavity and an inner surface which is parallel to the outer surfaces of said segments, and
(3) a means for radially pressing said side sealing plate toward said centre pin.

5. The press of claim 4, wherein said centre pin is threaded and said axial pressing means is threadedly attached to said centre pin.

6. The press of claim 4, wherein said means for angularly rotating said segments comprises a pair of radially projecting levers, each said lever being rigidly attached at its inner end to one said segment.

7. The press of claim 4, wherein said means for radially pressing said side sealing plate comprises a threaded press bolt which is threadedly attached to said cylindrical wall.

8. The press of claim 4, wherein said complementary side surfaces are helical or spiral.

9. The press of claims 4, wherein said sleeve segments have a sleeve thickness which is substantially equal to the unsintered radial height of said blank, including an additional shrinkage height allowance to compensate for shrinkage to be expected to occur during sintering.

10. The press of claim 9, wherein said allowance is approximately 20%.

11. The press of claim 4, wherein said means for angularly rotating said segments comprises a pair of jaws, each said jaw being rigidly attached at its inner end to one said segment and being rigidly attached to an underlying circular plate which loosely encircles said column and is disposed within said cylindrical side wall.

12. The press of claim 11, wherein each said circular plate is rigidly attached to a radially projecting lever.

13. The press of claim 12, wherein one said lever operates through a slot within said cylindrical wall.

* * * * *